US008347010B1

(12) United States Patent
Radovanovic

(10) Patent No.: US 8,347,010 B1
(45) Date of Patent: Jan. 1, 2013

(54) SCALABLE DATA STORAGE ARCHITECTURE AND METHODS OF ELIMINATING I/O TRAFFIC BOTTLENECKS

(76) Inventor: Branislav Radovanovic, Plymouth, MN (US)

(*) Notice: Subject to any disclaimer, the term of this patent is extended or adjusted under 35 U.S.C. 154(b) by 469 days.

(21) Appl. No.: 11/292,838

(22) Filed: Dec. 2, 2005

(51) Int. Cl.
G06F 12/00 (2006.01)
G06F 13/14 (2006.01)
G06F 13/38 (2006.01)
G06F 3/00 (2006.01)

(52) U.S. Cl. .......................... 710/240; 710/2
(58) Field of Classification Search .................. 710/2
See application file for complete search history.

(56) References Cited

U.S. PATENT DOCUMENTS

| 6,029,168 | A | 2/2000 | Frey |
| 6,427,212 | B1 | 7/2002 | Frey et al. |
| 6,530,036 | B1 | 3/2003 | Frey et al. |
| 6,820,171 | B1* | 11/2004 | Weber et al. ............ 711/114 |
| 7,127,633 | B1* | 10/2006 | Olson et al. ............. 714/4.4 |
| 7,225,317 | B1* | 5/2007 | Glade et al. ............. 711/206 |
| 7,228,391 | B2* | 6/2007 | Silvera et al. ............ 711/152 |
| 2002/0103889 | A1 | 8/2002 | Markson et al. |
| 2002/0103943 | A1* | 8/2002 | Lo et al. ................... 710/2 |
| 2003/0217310 | A1* | 11/2003 | Ebsen et al. ............. 714/42 |
| 2005/0289152 | A1* | 12/2005 | Earl et al. ............... 707/100 |

OTHER PUBLICATIONS

Science Direct, Patrick Geoffray, "OPIOM: Off Processor I/O with Myrinet", Myricom Inc., Jan. 1, 2002. pp. 1-14.*
Science Direct, Patrick Geoffray, "OPIOM: Off Processor I/O with Myrinet", Myricom Inc., Jan. 1 2002, pp. 1-14.*
Patrick Geoffray OPIOM: Off-Processor i/O with Myrinet.*
"High Bandwidth Data Transfer with OPIOM & Myrinet: Application to Remote Video," Goglin et al., Jun.-Aug. 2001.
"Guide to Myrinet—2000 Switches and Switch Networks," Myricon, Inc., Aug. 2001.
"SANique CFS a SAN-Based Cluster File System Technical Whitepaper," MacroImpact, Aug. 2002.
"VISA: Netstation's Virtual Internet SCSI Adapter," Van Meter et al., University of Southern California, 1998.
Application and File History of U.S. Appl. No. 11/208,773, Inventor Branislav Radovanovic, filed Sep. 29, 2003.

* cited by examiner

*Primary Examiner* — Chun-Kuan Lee
*Assistant Examiner* — Brooke Taylor
(74) *Attorney, Agent, or Firm* — Lathrop & Gage LLP

(57) ABSTRACT

An apparatus and method implemented in hardware and embedded software that improves performance, scalability, reliability, and affordability of Storage Area Network (SAN) systems or subsystems. The apparatus contains host computers (application servers, file servers, computer cluster systems, or desktop workstations), SAN controllers connected via a bus or network interconnect, disk drive enclosures with controllers connected via network interconnect, and physical drive pool or cluster of other data storage devices that share I/O traffic, providing distributed high performance centrally managed storage solution. This approach eliminates I/O bottlenecks and improves scalability and performance over the existing SAN architectures. Although this architecture is network interconnect (transport) neutral, additional improvements and cost savings could be made by utilizing existing, of the shelf, low latency and high speed hardware such as Advanced Switching (AS) or Myrinet networks as a transport for data, Small Computer System Interface (SCSI) and other commands and messages. Using AS or Myrinet network as a replacement for Fiber Channel (FC) would significantly reduce the cost of such SAN systems and at the same time boost performance (higher data transfer rates and lower latencies). This invention is about defining hardware and software architectural solution that is specifically designed to eliminate I/O traffic bottlenecks, improve scalability, and reduce the overall cost of today's SAN systems or subsystems. This innovative solution, in addition to it's performance superiority compared to the existing solutions, should also provide 100% compatibility with the all existing Operating Systems (OS), File Systems (FS), and existing applications.

32 Claims, 9 Drawing Sheets

Storage Area Network (SAN) with multiple controllers with distributed data access architecture

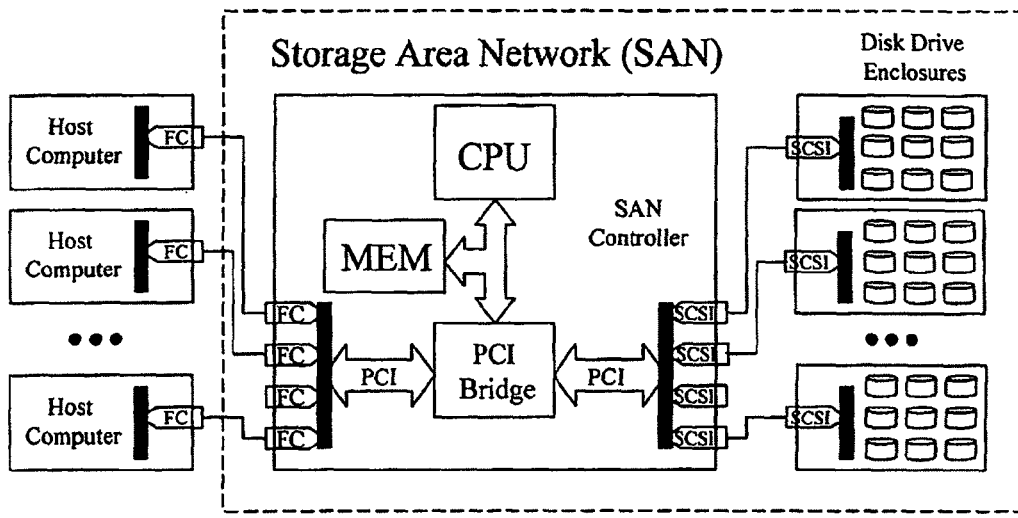
FIG. 1A Storage Area Network (SAN) with single controller utilizing SCSI disk drives
PRIOR ART
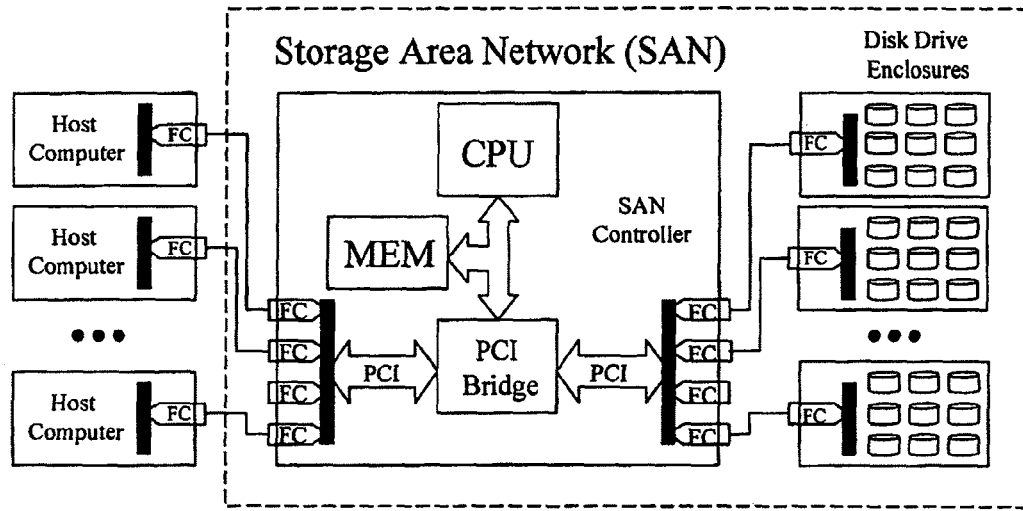
FIG. 1B Storage Area Network (SAN) with single controller utilizing FC disk drives
PRIOR ART

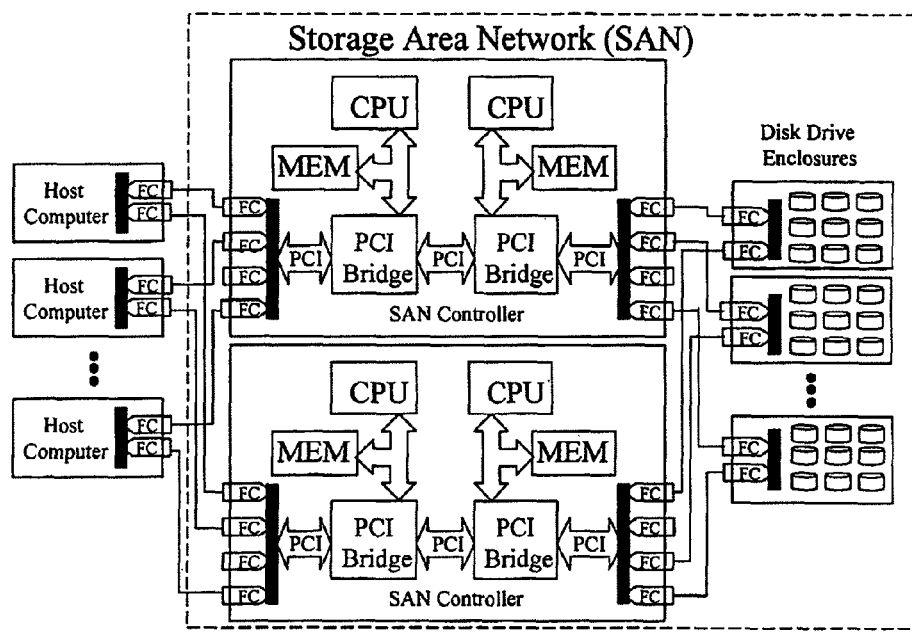
FIG. 2 Storage Area Network (SAN) with dual controller utilizing FC disk drives
PRIOR ART

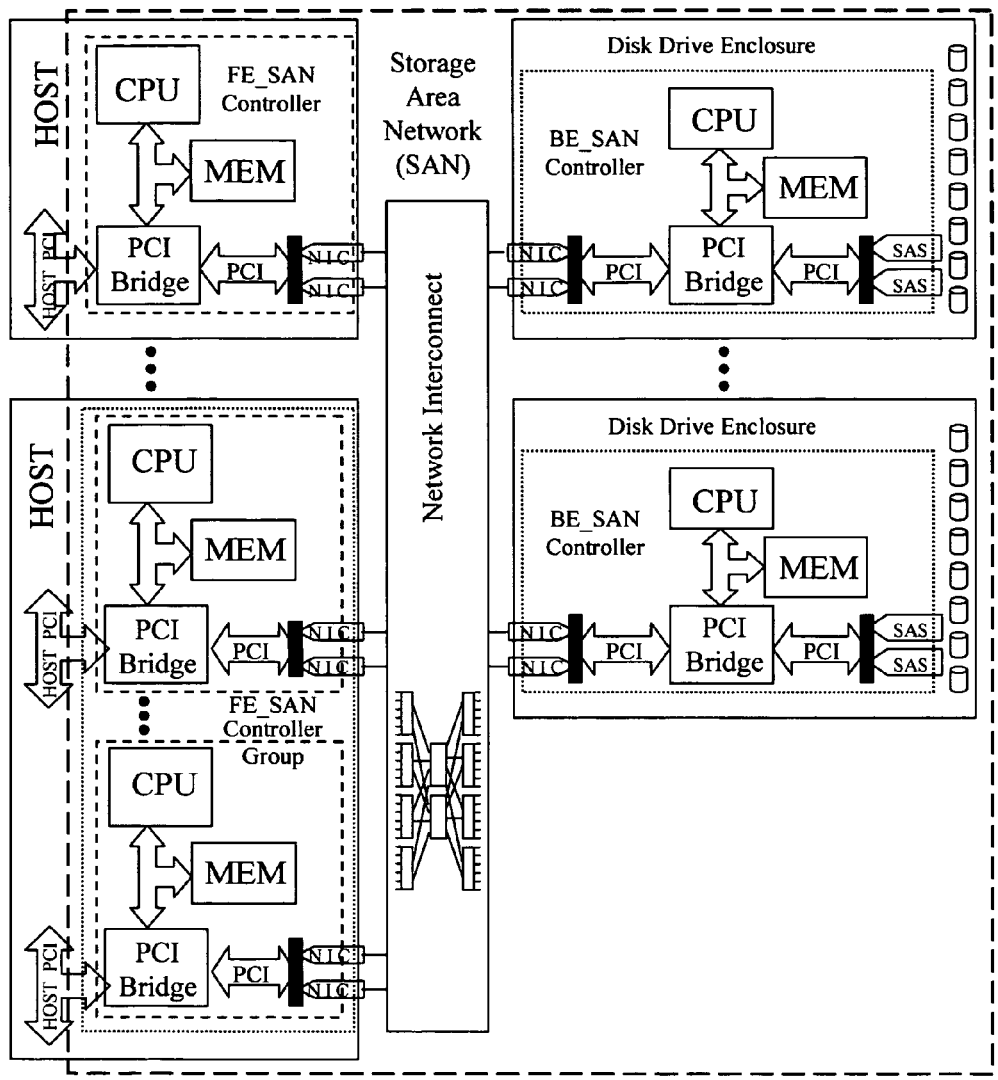
FIG. 3 Storage Area Network (SAN) with multiple controllers with distributed data access architecture

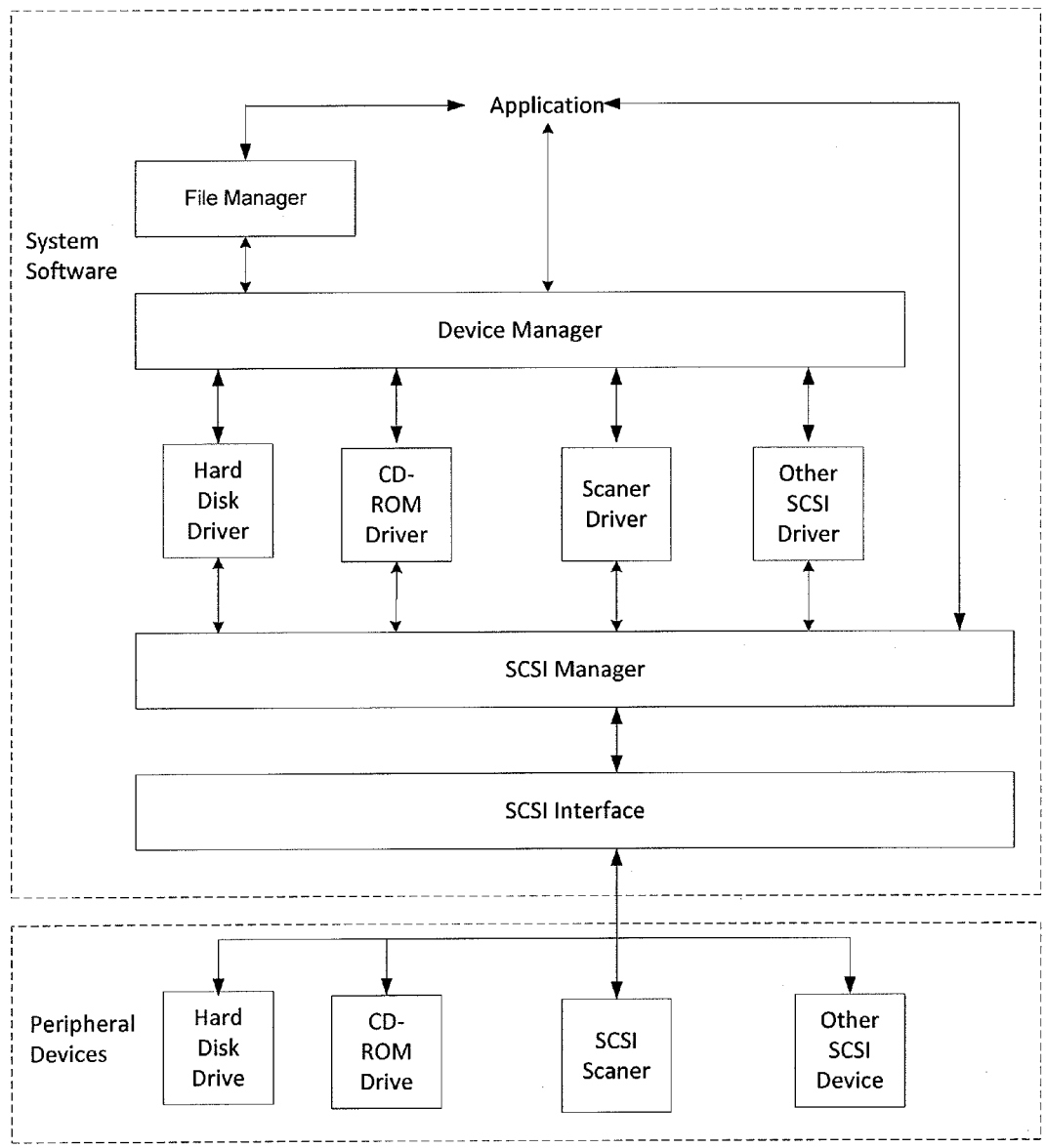
FIG. 4 System view of I/O related layers to access SCSI devices
PRIOR ART

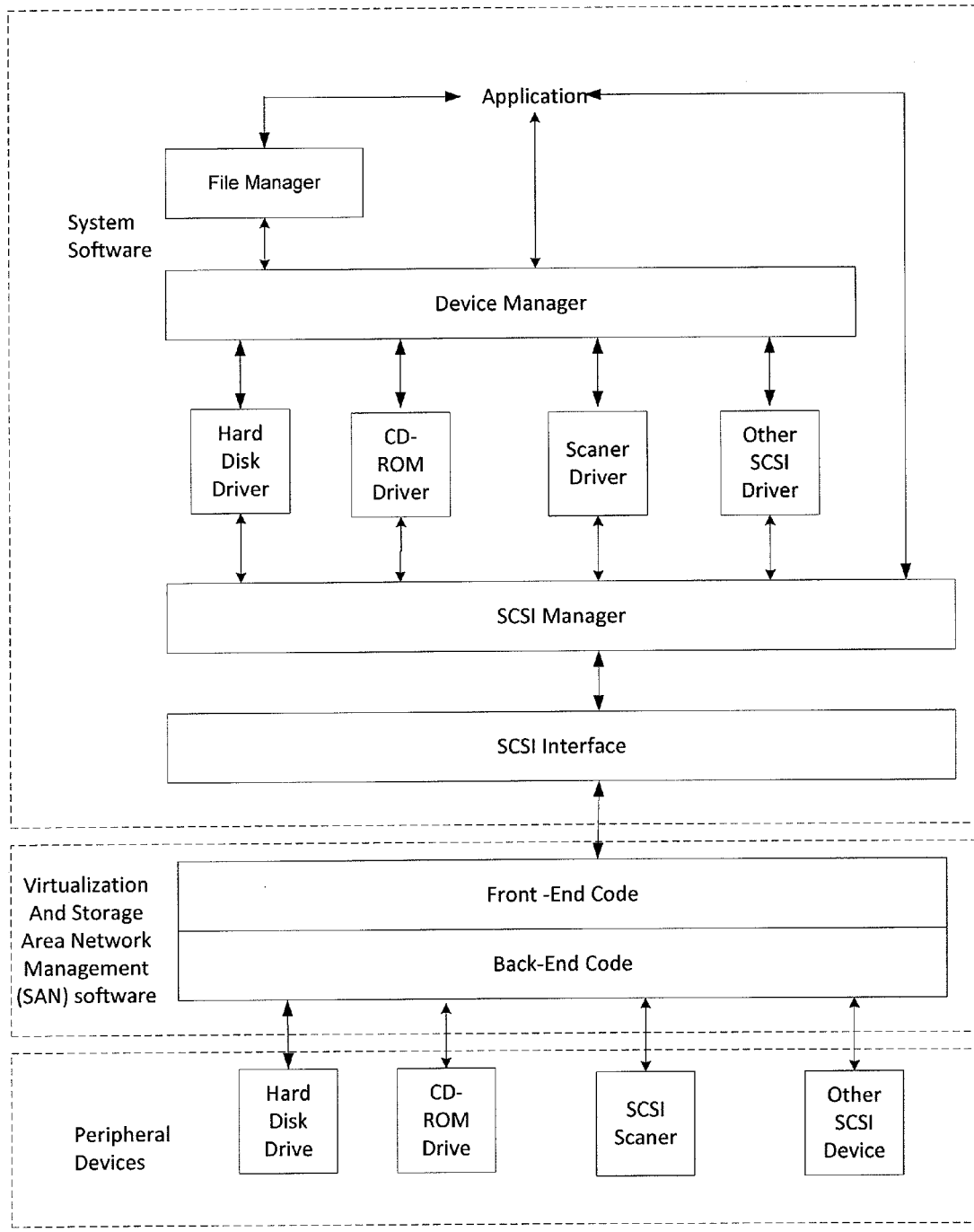
FIG. 5A System view of I/O related layers to access SCSI devices over Storage Area Networks (SAN)
PRIOR ART

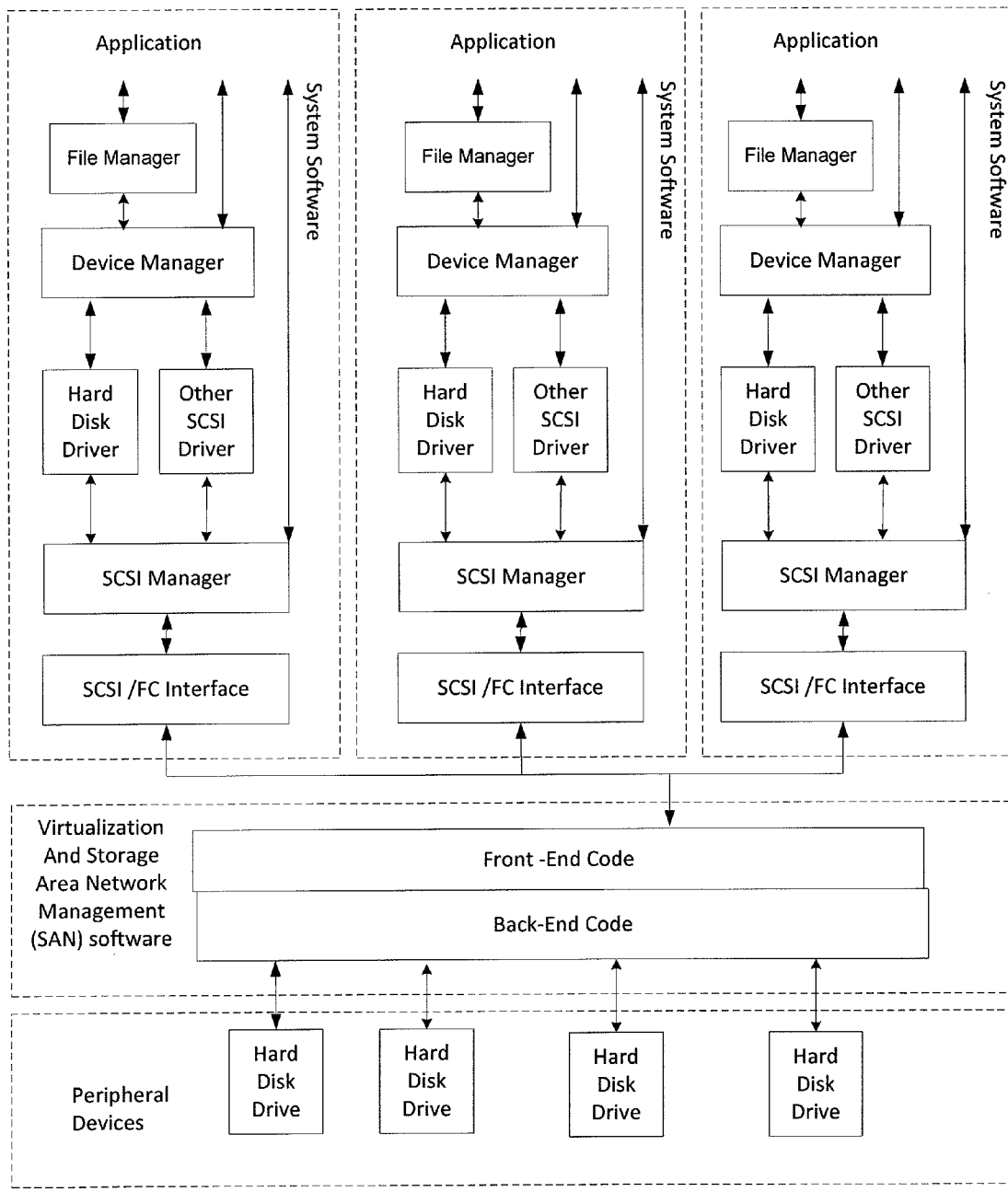
FIG. 5B System view of I/O related layers to access SCIS devices over Storage Area Networks (SAN)
PRIOR ART

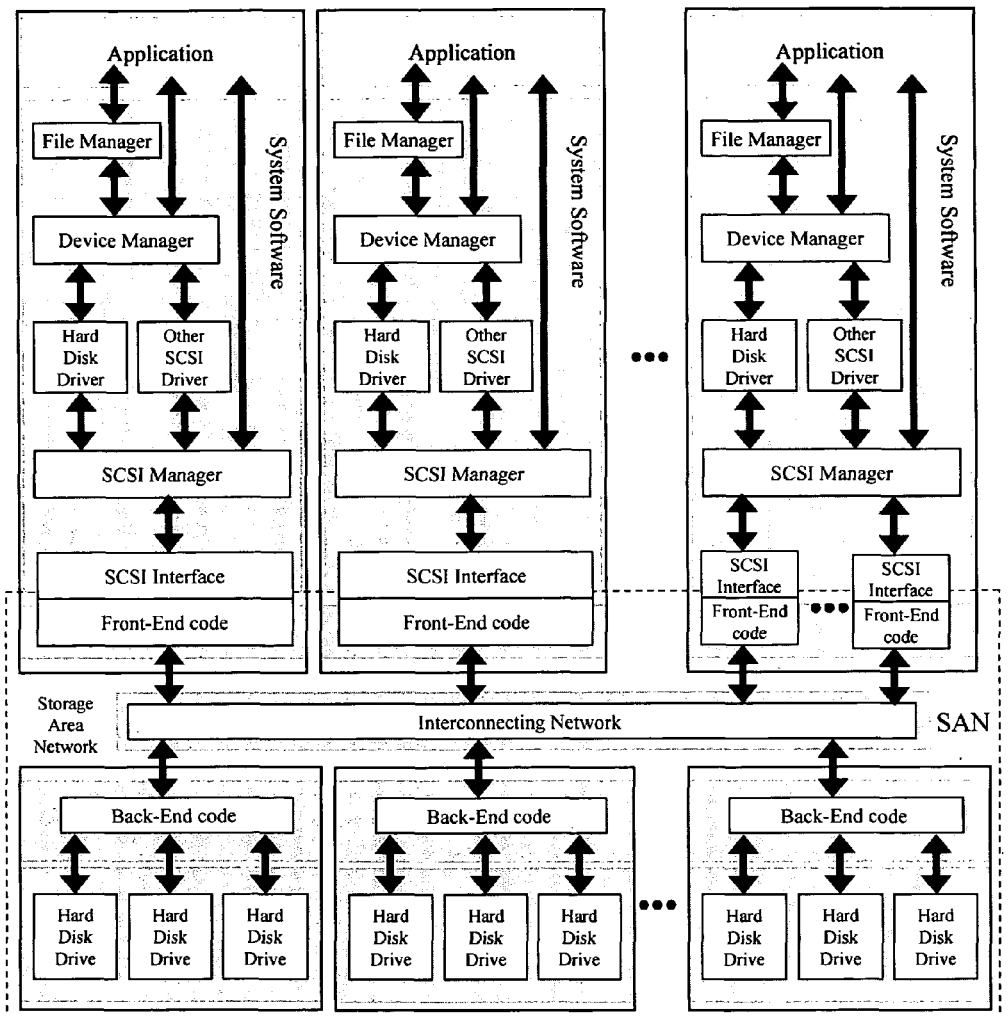
FIG. 6 System view of I/O related layers to access SCSI devices over Storage Area Networks (SAN)

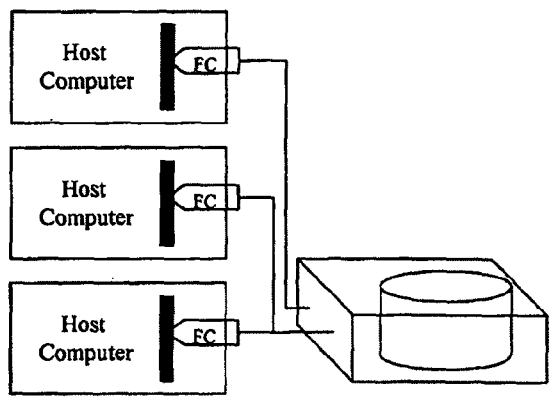
FIG. 7A Single disk drive provides
reservation and persistent reservation
PRIOR ART
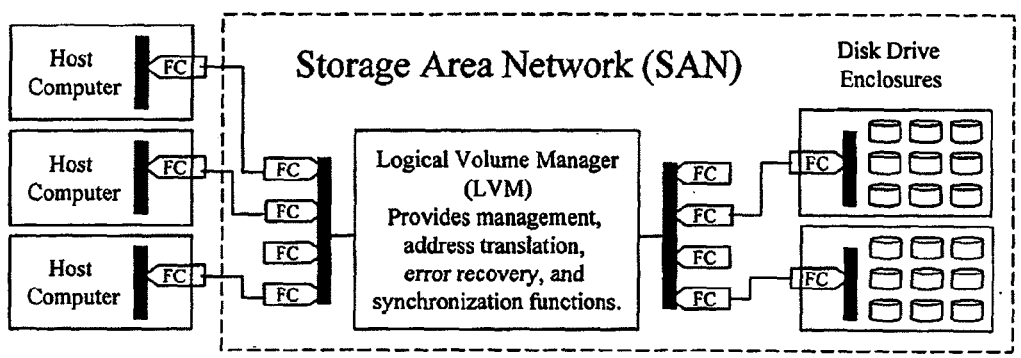
FIG. 7B Monolithic Logical Volume Manager (LVM)
provides reservation and persistent reservation
PRIOR ART

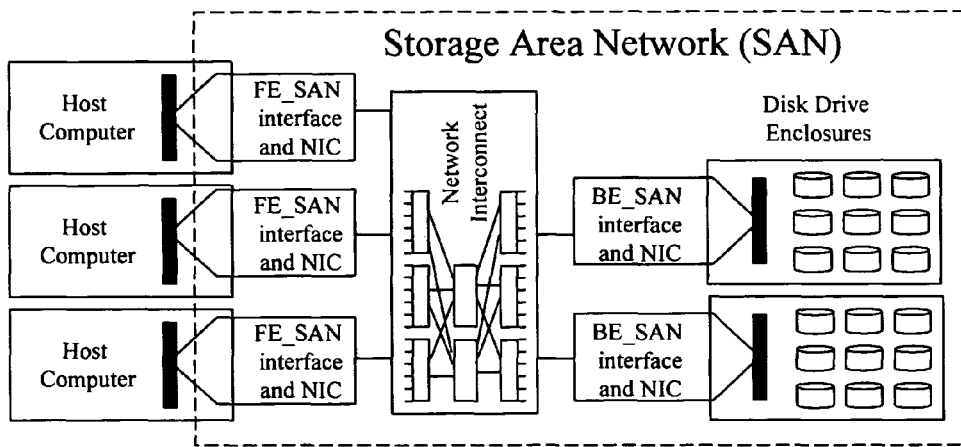

FIG. 8A The architecture described in the invention uses
distributed (over the network) Logical Volume Manager (LVM)
providing reservation and persistent reservation
and other locking mechanisms.

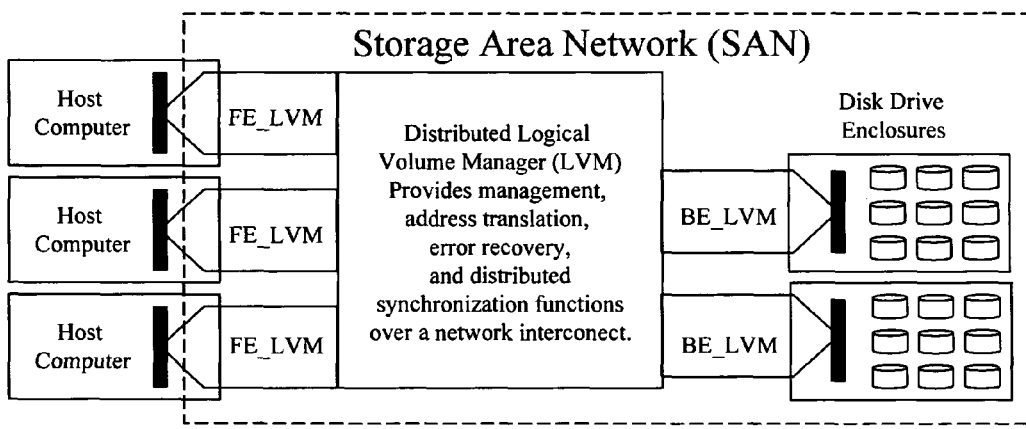

FIG. 8B Front-End LVMs (FE_LVMs) run independently from each other
and allocate resources as needed from the Back-End LVMs (BE_LVMs)
thus providing exclusive access to the allocated Logical Block Addresses

SCALABLE DATA STORAGE ARCHITECTURE AND METHODS OF ELIMINATING I/O TRAFFIC BOTTLENECKS

BACKGROUND OF THE INVENTION

This invention relates generally to the field of storage RAID controllers and Storage Area Network (SAN) systems. Mainly to improving data access speeds by facilitating massively parallel data access by separating Front-End and Back-End software functionality. Thus, executing appropriate code concurrently on separate Front-End Storage Area Network (FE_SAN) and Beck-End Storage Area Network (BE_SAN) controllers connected via high-speed network (switched fabric such as Advanced Switching (AS), Infiniband, Serial Attached SCSI (SAS), Fibre Channel (FC), Myrinet, etc.).

As ever-increasing demand for more data hence, for more data storage, SAN and RAID technologies available today have failed to meet performance requirements and with prohibitively high cost made them out of reach for the majority of the small and some medium size businesses. By utilizing this enabling scalable technology that uses, mostly, of the shelf components to bring the cost down and it is specifically designed to extend system capabilities and eliminate I/O bottlenecks. The majority of small and medium businesses should be able to afford such entry-level systems (with few FE_SAN and BE_SAN controllers) and add more controllers for more capacity and performance as they grow.

A majority of small and some medium size businesses and corporations, recognizing the productivity gains resulting from high performance and high availability computing systems are often unable to acquire suchlike systems due to prohibitively high cost of data storage subsystems. To reduce the cost they often utilize large number of disjoint individual servers where each server is dedicated to one or more specific applications, such as mail servers, accounting packages, etc. This environment, clearly, leads to underutilized available aggregate computing power of all servers since each server is dedicated to specific application and the workload cannot be shared. This approach introduces other issues such as system and network administration, fault tolerance, fragmented data storage, data storage and backup management problems, as well as system complexity, and so forth. Data access and data sharing could be done at different levels such as block access (shared storage), multiple hosts accessing the same disk drives or Logical Unit Numbers (LUNs), or using file systems like Network File System, Common Internet File System, etc.

A Network File System (NFS) is a client/server application that facilitates viewing and optionally storing and updating files stored on a remote computer (often called file server). The client system, which may be a work station or cluster node, has to run an NFS client and the other computer, file server, needs the NFS server software. Both computers typically must have networking protocol software such as Transmission Control Protocol/Internet Protocol (TCP/IP) and networking hardware such as Ethernet, Infiniband, Myrinet, or other Network Interface Cards (NICs) installed, since the NFS server and NFS client use network protocols to send the files and updates back and forth. This approach leads to a bandwidth bottleneck on both client and file server sides due to NFS protocol overhead, limited Peripheral Component Interconnect (PCI) bus data rate, and possibly high latency associated with traditional architecture of the data storage subsystem attached to it.

A protocol standard developed by Microsoft, Common Internet File System (CIFS), that allows programs to make requests for files and services located on remote computer facilitates the same basic function as previously mentioned NFS. CIFS is typically utilized in Microsoft operating system environments to allow shared access from one computer to files stored on another remote computer within the same network. A CIFS client makes a request to a CIFS server (usually in another computer) for a file access or to pass a message. The server executes a requested action and returns a response. CIFS is a public version of the Server Message Bock (SMB) protocol. The file server running CIFS suffers from the same problems as earlier mentioned NFS server because, this is in essence the same or similar hardware and technology. This clearly reveals the need to get data (disk storage) as close as possible to host CPU (memory).

TCP/IP protocol overhead together with network latency affects the performance of NFS/CIFS subsystems by significantly increasing access delays for network-attached disk when compared to locally attached disk. However, locally attached disk performance, usually, is much worse compared to data storage subsystem implementations such as RAID or Storage Area Network (SAN) subsystem. Traditional SAN design and implementation even though in many cases superior to locally attached disk drives, underutilize aggregate data rate potential of all attached disk drives by making use of time division multiplexing over typically small number of I/O (network) links between servers and the SAN subsystem attached to it.

To achieve the best performance with today's SAN technology every server or cluster node should be connected directly or through a rearrangeably non-blocking switched fabric to the SAN subsystem. The SAN subsystem should be able to support the sum of data rates on all links between the servers (or cluster nodes) and the SAN subsystem without significantly increasing the command queue size (the number of outstanding requests in the queue waiting to be executed). However, the architectural designs (hardware and software) of today's SAN subsystems create bottlenecks in the SAN controllers due to insufficient aggregate bandwidth and limited scalability. Even though Fibre Channel is designed with the intent to allow similar architectures, the protocol complexity and prohibitively high cost of the FC technology (HBAs and FC switches) effectively prevented significant progress in the field of data storage.

SUMMARY OF THE INVENTION

A number of industry trends created the opportunity and the need for the subject invention. As relatively inexpensive servers and computer cluster systems became widely accepted by the industry as a valuable alternative to expensive main frames (high-end multi-processor systems) and supercomputers, the need to make storage subsystems more affordable became more important than ever. Since the amount of data generated in the world doubles every two to three years it is clear that some kind of high-performance tiered scalable architecture is needed to meet growing need for the data storage. However, it is not enough just to increase the storage capacity but at the same time to transparently improve the system performance, data transfer speeds and reduce latencies.

More particularly now, the present invention is an improvement over the existing data storage architectures by means of allowing parallel execution of the Front-End code on the independent FE_SAN controllers and employing locking mechanism in the Back-End code (executed on the BE_SAN controllers) to enforce data coherency and prevent data corruption.

In a preferred embodiment, the FE_SAN controllers accept all Small Computer System Interface (SCSI) commands, messages, and data for Front-End processing. The resulting output is forwarded to their intended BE_SAN controllers over the interconnecting network. Any network topology is allowed. From the BE_SAN controllers the SCSI commands, data, and messages after Back-End processing are forwarded to the anticipated SCSI targets (disk drives) or other storage or memory resident "devices". Neither SCSI target devices (disk drives) nor initiators (host computers) are aware of the underlying transport or FE_SAN and BE_SAN controllers. Hosts would perceive a "virtual" disk drive (or drives) attached to the FE_SAN (one or more) controllers. FE_SAN controllers could be configured as a controller group to share the load (command and message processing), enhancing the available bandwidth, and improving availability. In such cases, the host would have a notion of a single multi-channel controller attached to it.

A number of different storage interfaces may be supported at the back-end controller with this invention, including standard devices such as SCSI, SAS, Advanced Technology Attachment (ATA), Serial ATA (SATA), FC, and other similar disk storage as well as PCI Express (PCIe), Hyper Transport (HT), etc. interfaces.

The FE_SAN interface card (FE_SAN controller) may be provided in different physical formats, PCI, PCI-X, PCIe, or SBus interface board formats. Each FE_SAN interface card has firmware (software) that provides SCSI device discovery, error handling and recovery, and some RAID functionality. The back-end may be provided in a number of different physical formats such as in the standard disk drive enclosure format (including 19 inch rack and standalone enclosures), or an integrated circuit that is easily adaptable to the Standard interior configuration of a SAN controller.

Each BE_SAN controller has firmware (software) that provides SCSI device discovery, fault management, RAID functionality, access to the portions of the physical disk locking methods, RDMA capability, and error handling functionality. The firmware on each BE_SAN controller (interface) provides all the functionality necessary to interface target disk storage interface such as SCSI, SAS, ATA, SATA, or FC disk drives or other data storage devices.

BRIEF DESCRIPTION OF THE DRAWINGS

The foregoing and other objects, features and advantages of the invention will be apparent from the following more comprehensive description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 1A and 1B illustrate, respectively, typical low-end to mid-range SAN architecture that utilizes SCSI bus or FC network to transport commands and data between host and a data storage subsystem (SAN). Such SAN controller supports multiple virtual volumes (LUNs) creating an illusion that there are many independent high performance disks providing improved reliability and performance compared to a single disk drive. Both Front-End and Back-End code run on the same SAN controller providing as much bandwidth as such hardware and loaded firmware (software) sustains. Traffic from all the hosts (servers) is serviced by the controller. If I/O traffic exceeds controller-processing capability, all new requests will cause command queue to grow creating a performance bottleneck. This legacy solution does not scale well since there is no option of scaling the processing power by adding more controllers, if it is needed.

FIG. 2 illustrates improved SAN architecture; to improve the speed Front-End code (host specific functionality, virtual volume management, etc.) is executed on the Front-End CPU while Back-End code is executed on the Back-End CPU. A virtual volume (LUN) could be accessed through one SAN controller only while the other controller(s) are used to host other LUNs. Incoming requests, data structures, command queues, and data cache are mirrored through the Back-End FC connections to support transparent fail-over in case that the either (but not both) SAN controller fails. There are other similar implementations where controllers are connected via dedicated bus thus allowing faster controller synchronization. Both previously motioned approaches suffer from lack of scalability to thousands or even hundreds of controllers thus the inability process the requests to the same LUN concurrently on the different controllers.

FIG. 3 illustrates new approach to SAN architecture; to improve the speed Front-End code (host specific functionality, virtual volume management, etc.) is executed on the Front-End CPU concurrently, in other words, multiple instances of the same code run independently on all FE_SAN controllers. Back-End code is executed on the Back-End CPU, independently of the other Back-End code instances executed on different BE_SAN controllers. The Back-End code provides RAID functionality, error recovery, locking mechanism to ensure data integrity, etc. It is apparent that this architecture has tremendous potential to scale to very large number (tents or even hundreds of thousands) of both FE_SAN and BE_SAN controllers creating exceptional aggregate bandwidth. In various simulations, no I/O bottlenecks are observed regardless of the number of the host computers attached to the SAN.

FIG. 4 shows a system view of I/O related layers to access SCSI devices using standard SCSI interface;

FIGS. 5A and 5B is a system view of I/O related layers to access virtual volume (LUN) via traditional RAIDs or Storage Area Networks; The host has notion of being attached to an ordinary SCSI device (disk drive or some other storage device). However, in reality, it sees only a virtual volume (LUN) that is spread across number of physical disk drives.

FIG. 6 is a system view of I/O related layers to access virtual disk (LUN) utilizing the new SAN architecture. Same as in traditional SAN solutions, the host has notion of having an ordinary SCSI device (disk drive) attached to it. The Front-End code creates a virtual device (virtual volume or LUN) that supports all (but not limited only to) mandatory SCSI commands. However, using the same method any other device could be emulated such as tape drive, DVD drive, etc. The main difference between Front-End codes used in FIG. 6 and in FIG. 5B is that in FIG. 6 there are many instances of the same Front-End code that are running on FE_SAN controllers simultaneously providing much higher processing power compared to the Front-End code used in FIG. 5B. Similarly, the Back-End code used in FIG. 6 runs in parallel providing the superior performance due to concurrent execution, compared to the Back-End code used in FIG. 5B. The key element is collaborative synchronization method between Front-End and Back-End code to ensure data integrity thus, allowing performance to scale with number of controllers.

FIG. 7A illustrates single disk drive attached to the multiple initiators. FIG. 7B illustrates Storage Area Network system utilizing monolithic Logical Volume Manager (LVM) to emulate behavior of the single disk or multiple drives. In both cases, from FIGS. 7A and 7B, the synchronization is done by the hosts utilizing reservation, persistent reservation or other access control methods. This monolithic LVM could create the bottleneck during heavy I/O traffic.

FIGS. 8A and 8B illustrate, respectively, architectural changes to the system described in FIG. 7B (paragraph [0019]) by utilizing distributed (over the network) Logical Volume Manager (LVM) providing reservation and persistent reservation and other locking mechanisms. Front-End LVM (FE_LVM) instances run independently from each other and allocate resources as needed from the Back-End LVM (BE_LVM) instances thus, providing virtually exclusive access to the allocated Logical Block Addresses (LBAs). However, this does not necessarily limit data transfers only to a single data stream to those LBAs, which will be explained in the subsequent paragraphs. This architecture facilitates parallel execution of the FE_LVM and BE_LVM code eliminating the bottleneck and providing excellent scalability.

DETAILED DESCRIPTION OF THE INVENTION

A description of preferred embodiments of the invention follows.

FIGS. 1A and 1B, illustrate legacy approach to Storage Area Network design and implementation. Such SAN controller supports multiple virtual volumes (LUNs) creating an illusion that there are many independent disks. Both Front-End and Back-End code run on the same SAN controller providing as much bandwidth as such implementation (hardware, firmware, or embedded software) allows. In addition, unusually, there is only one instance of code and data structures that handles particular virtual disk. Therefore, all I/O traffic associated with that particular virtual disk is handled by that code instance which could become a bottleneck in heavy I/O traffic conditions. Some solutions utilize shared memory architecture to improve I/O bandwidth. However, again, one single instance of the data structures has to be accessed creating opportunity for a bottleneck to occur. As motioned in the preceding paragraphs, this solution does not scale well since there is no option of scaling the processing power by adding more controllers.

FIG. 3, the present invention, illustrates the hardware architecture that enables parallel execution of the Front-End and Back-End code on the FE_SAN and BE_SAN controllers respectively. There are multiple instances of the Front-End code, preferably one or more per host or cluster node. Likewise, one or more BE_SAN controllers at the back-end execute Back-End code in parallel. FE_SAN and BE_SAN controllers are connected via interconnecting network, preferably via rearrangeably non-blocking Clos Network utilizing but not limited to inexpensive AS or Myrinet switches. Nevertheless, any network topology is allowed since the architecture is network (transport) neutral. However, if the underlying network provides lower latency and higher bandwidth the whole architecture will deliver better performance. This approach yields to the higher data rate and I/O performance compared to previously described legacy SAN system.

Preferably the present invention is implemented in firmware running over a multi-tasking pre-emptive Real Time Operating System (RTOS) on hardware platform comprised of one or more embedded Central Processing Units (CPUs), possibly Application-Specific Integrated Circuits (ASIC), or Field-Programmable Gate Arrays (FPGA), a Random Access Memory (RAM), and programmable input/output (I/O) interfaces. It is to be appreciated that the various processes and functions described herein may be either part of the hardware, embedded microinstructions running on the hardware, or firmware (embedded software) executed by the RTOS. However, it should be further understood that the present invention might be implemented in various other forms of hardware, software, firmware, or a combination thereof.

FIGS. 5A and 5B are high-level block diagrams that illustrate software layers inside the system software on the host side and Front-End and Back-End layers specific for legacy RAID and Storage Area Network controller. Certainly, there are more than just Front-End and Back-End layers in a SAN software architecture however, this is not relevant for understanding of the concepts used in this invention.

SCSI standard defines the device model and SCSI command set for all SCSI devices (please see FIG. 7A). The SCSI command set is designed to provide efficient peer-to-peer operation of SCSI devices (disks, tapes, printers, etc.) by an operating system. The SCSI command set provides multiple operating systems concurrent control over one or more SCSI devices. However, proper coordination of activities between the multiple operating systems is critical to avoid data corruption. Commands that assist with coordination between multiple operating systems are described in the SCSI standard.

FIG. 6, is a high-level block diagram that illustrates how Front-End and Back-End code are executed in parallel and independently on FE_SAN and BE_SAN controllers. Even though, SCSI standard provides methods for a number of hosts (operating systems) concurrently accessing and asserting control over SCSI devices, in a complex system such as the one shown on the FIG. 6 that may not be sufficient. If there was no mechanism to internally enforce atomic execution for read, write, and some other commands, the data integrity could be jeopardized. Consequently, such locking mechanism that provides atomicity has to be built in to the system. The issue is that some kind of the actions (requests or commands) that have to be atomic must not be executed until it is safe to do so.

Atomic execution for some commands in the system from FIG. 6 is essential part of the invention since it protects the data integrity. Front-End code, generally, performs command processing and Virtual Block Address (VBA) translation to Logical Block Address (LBA) and sends them to the appropriate BE_SAN controllers. The Back-End code, then, checks whether the command could be executed immediately or not. The command may have to be queued for later execution, or yet BUSY signal could be returned to the Front-End code. Since, the Front-End and Back-End codes execute asynchronously before a command that requires atomic execution, such as writing to device media, could be started all the requirements for successful command completion have to be met.

For example, to ensure correct execution of a WRITE command, LBAs that data have to written to have to be locked and off limit to other WRITE or READ commands. That means that WRITE command has to be executed atomically. The Front-End code will examine the command; determine that a WRITE command had been received. Then it will send a LOCK request to the appropriate BE_SAN controllers to acquire distributed lock. Back-End code will respond acknowledging successful locking of the requested LBAs. At this point, it is safe to write to the locked LBAs, LBAs usually spread across multiple disk drives. Upon the successful completion of the WRITE command, the LOCK is removed by the Front-End code. There are some other commands that might require atomic execution, however the same locking mechanism could be used for those commands.

Previously described method would not permit concurrent writes to occur to the same LBAs which would limit the write performance to a single file. Indeed, it is not possible to actually write data to a disk media simultaneously from two different and independent sources without having a risk of actually corrupting the data. However, if sufficient buffer space is available at BE_SAN controllers the data that have to be written from number of different hosts (initiators) could be concurrently spooled into pre-allocated independent memory buffers without risking data corruption. To achieve this kind of parallelism on a WRITE request FE_SAN controller will request a LOCK for all LBAs that have to be written to. If currently there are no other writers, the LOCK will be granted. However, if there is another writer holding a LOCK, every BE_SAN controller has to be written to will check if there is sufficient buffer space to satisfy the request. If the request could be satisfied a tagged-LOCK will be issued and the data transfer from the host to the allocated buffer would be initiated. The actual writes to the disks would be done in the order that tagged-LOCKs are granted. If the Front-End code for some reason was unable to acquire a LOCK on all the LBAs it needs it will release all already locked LBAs and start the process all over again. In case that default number of attempts is exceeded upper management software layers will resolve the issue by verifying the reason for the unsuccessful locking.

An additional advantage is that the LOCKS are associated with LUNs using specific ID (identifiers). Therefore, Back-End code would not have to search through long LOCK tables to discover whether a command (request) could be executed or not. Another advantage is that only LBAs that are locked out might be inaccessible during that time. All other LBAs are accessible allowing greater level for parallelism.

The actual implementation may vary due to use of some specific hardware or of the shelf software. However, the principal architecture would not change. It would be relatively straight forward to use of the shelf inexpensive but not limited to x86 hardware platform with embedded RT OS or embedded Linux OS on it for the BE_SAN controllers since great deal of functionality is already available. For the FE_SAN controllers the same platform could be used as for the BE_SAN controllers. However, if AS or Myrinet network is the interconnect of choice between FE_SAN and BE_SAN controllers it would be natural to use of the shelf or modified PCIe single board computer or Myrinet interface cards to execute Front-End code on them. For entry-level systems, where the cost is more important than performance, the Front-End code could be embedded in the device driver.

What is claimed is:

1. A data processing system comprising:
one or more host Central Processing Units (CPUs), the host CPUs running a host operating system and having a host system bus for interconnecting other data processing system components to the host CPUs;
at least one Front End SAN controller (FE_SAN), including a data memory, physically co-located with each of the one or more host CPUs and interconnected via the host system bus to the co-located host CPU;
a front-end network-interface coupled to each of the at least one FE_SAN;
at least one remotely located Back End SAN controller (BE_SAN) interconnected via a back-end system bus to one or more disk drive interfaces that each control a plurality of storage devices remotely located apart from at least one of the one or more host CPUs;
a back-end network-interface coupled to each of the at least one BE_SAN via the back-end system bus;
a network fabric interconnecting the front-end network-interface of the FE_SAN controllers with the back-end network-interface of the remotely located BE SAN controllers; and
SAN virtualization software executing on the FE_SAN controllers and the BE_SAN controllers;
wherein the SAN virtualization software of the FE_SAN controllers is configured to request data from the BE_SAN when data is required by a host CPU so that data may be transferred to a host CPU of the at least one host CPU from at least one storage device of the plurality of storage devices;
and wherein the SAN virtualization software of the FE_SAN requests a write lock from the at least one ~BE_SAN controllers on receiving a write command from the host, upon grant of write lock by the BE SAN the FE SAN writes data to the BE SAN for writing to an appropriate storage device, and releases the write lock on completing writing of data to the BE SAN so that data may be transferred from a host CPU to an appropriate storage device;
wherein the Back End software includes access control software that is configured to restrict read or write access to a specific logical block addresses (LBAs) during writes to prevent data corruption while allowing concurrent unrestricted access other unlocked logical blocks;
wherein there are at least two FE_SANs, and wherein if a first FE_SAN and a second FE_SAN request write lock to a same logical block address, the BE_SAN grants a lock request to the first FE_SAN upon when its buffer has sufficient space for the indicated amount of data of the first FE_SAN's write lock request or when the appropriate storage device is available for writing; and when the BE_SAN grants write lock to the second FE_SAN when it has sufficient buffer space available both for the indicated amount of data of the first FE_S-AN's write lock request and for an indicated amount of data of the second FE_SAN's write lock request.

2. A system as in claim 1 wherein the SAN virtualization software is divided into Front-End specific software running on the FE SAN controllers that includes host specific software configured to improve read and write performance, a virtual volume manager, and network driver modules; and
Back-End specific software running on the BE_SAN controllers that includes initiator drivers, a Redundant Array of Inexpensive Drives (RAID) engine, network drivers, and related management, monitoring, and error recovery modules;
wherein the Front-End specific software and the Back-End specific software are each configured to connect with the other via the network fabric such that the virtual volume manager provides the host CPU virtual access to the plurality of storage devices.

3. A system as in claim 1 wherein at least one of the storage devices is a SCSI target or a SCSI disk drive that is unaware of the BE SAN controller, the FE_SAN controller, the network fabric intermediate the host CPUs and the disk drive interfaces, and receives requests from one or more host interfaces as from ordinary SCSI initiators.

4. A system as in claim 1 wherein the disk drive interface is configured as a standard disk storage interface selected from the group consisting of Advanced Technology Attachment (ATA), Serial ATA (SATA), Small Computer Systems Interface (SCSI), Serial Attached SCSI (SAS), iSCSI, or Fibre Channel (FC).

5. A system as in claim 1 wherein a FE SAN controller is integrated with one of a Network Interface Card (NIC) or a System-on-a-chip (SoC) running Front-End software connected to the host CPU via a different standard bus interface specification than that of a Back-End bus interface connecting at least one of the one or more disk drive interfaces to the storage devices.

6. A system as in claim 1 wherein a FE_SAN controller is implemented in one of a Network Interface Card (NIC), a System-on-a-chip (SoC), or in a device driver, coupled to the host system bus interconnected to the host CPU.

7. A system as in claim 4 wherein the Front-End interfaces and the Back-End interfaces are SCSI Primary Commands (SPC), SCSI-2 Primary Commands (SPC-2), SPC-3, SPC-4, SCSI Architecture Model (SAM), SAM-2, SAM-3, or SAM-4 compliant so as to be SCSI compatible.

8. A system as in claim 5 wherein the Front-End interface is Small Computer Systems Interface (SCSI) compatible and the Back-End interface is Advanced Technology Attachment (ATA), Serial ATA (SATA), Small Computer Systems Interface (SCSI), Serial Attached SCSI (SAS), iSCSI, or Fibre Channel (FC) compatible.

9. A system as in claim 1 wherein the FE_SAN controller includes Front-End software that is configured to use a software architecture implemented over a multithreaded real time operating system to isolate a Front-End interface functions and a network interface functions as separate tasks.

10. A system as in claim 1 wherein the Front-End interface and the Back-End interfaces are provided within one of a standard disk drive enclosure or a System on a Chip (SoC) format.

11. A system as in claim 1 wherein the Front-End interface is provided in one of a Peripheral Component Interconnect (PCI), PCI-X, PCI Express (PCIe), Hyper Transport (HT) or S-BUS interface board format.

12. A system as in claim 1 wherein one FE_SAN controller includes Front-End software that runs independently and in parallel with Front-End software running on other FE_SAN controllers or FE_SAN controller groups.

13. A system as in claim 1 wherein the least one FE_SAN controller includes a Front-End interface configured to accept Small Computer Systems Interface (SCSI) requests based on a Virtual volume Block Addresses (VBAs) via the host system bus, to process the SCSI requests, including address translation, and acquisition of locks, and transmit the SCSI requests to the at least one BE_SAN controller or a group of BE_SAN controllers;

wherein each BE_SAN controller includes Back-End software running on the BE_SAN controllers configured to receive and process the SCSI requests and to forward the SCSI request to the storage devices.

14. A system as in claim 12 wherein the Front-End interface includes software that is configured to map disk access requests for specific virtual drive blocks to a specific BE_SAN controller that is configured to perform access control and Redundant Array of Inexpensive Disks (RAID) functionality for accessing physical disk drives operably attached to the BE_SAN controller.

15. A system as in claim 1 wherein a physical disk drive is selectively attachable to a plurality BE_SAN controllers so as to provide access to the physical disk drive from remotely located FE_SAN controllers.

16. A system as in claim 13 wherein data transferred between memory in a host CPU, memory in a FE_SAN controller, and memory in a BE_SAN controller is transferred using RDMA (Remote direct Memory access).

17. A system as in claim 1 wherein the access control software is further configured to facilitate concurrent writes to the same LBAs by allocating separate independent buffers for every write request and issuing a unique tagged LOCK for every write request thus, concurrent and out-of-order writes are consolidated during the data transfers or after the data transfers are complete, thereby preventing data corruption.

18. A system as in claim 1 wherein the access control software is initiated by the host CPU or by the FE_SAN controller allowing the Front-End software to run in parallel.

19. A system as in claim 17 wherein the access control software is also configured to provide for concurrent writes in data sharing environments wherever an atomic transaction needs to be enforced and data corruption prevented.

20. A system as in claim 1 wherein the one or more host CPUs are selected from the set including host computers, server blades, or computer cluster nodes.

21. A system as in claim 1 wherein the storage devices are selected from the set including Advanced Technology Attachment (ATA), Small Computer Systems Interface (SCSI), or Fibre Channel (FC) disk drive devices.

22. A system as in claim 1, the at least one FE_SAN controller further including a Front-End Logical Volume Manager (FE_LVM) configured to provide Virtual Block Address (VBA) translation to Logical Block Address (LBA), to transmit a LOCK request for a LBA for a READ or WRITE command to the BE SAN controller over the network fabric; and the at least one BE_SAN controller further including a Back-End Logical Volume Manager (BE_LVM) configured to receive and grant the LOCK request for the LBA from the BE_SAN controller, to acknowledge a successful LOCK of the locking mechanism, and to perform an atomic execution of the READ or WRITE command to the appropriate storage device.

23. A data processing system comprising:

a plurality of host Central Processing Units (CPUs), the host CPUs each running a host operating system and each having a host system bus for interconnecting data processing system components to the host CPU;

a plurality of Front End SAN controllers (FE_SAN), including a data memory, at least one of the plurality of FE_SAN being physically co-located with each one of the plurality of host CPUs and interconnected via the host system bus to the co-located host CPU;

a front-end network-interface coupled to each one of the plurality of FE_SAN via the host system bus;

a plurality of Back End SAN controllers (BE_SAN), each including a locking mechanism and interconnected via a back-end system bus to one or more disk drive interfaces that control a plurality of storage devices, the BE_SAN controllers and storage devices being physically separated from the plurality of host CPUs and FE SAN controllers, wherein the locking mechanism enforces data integrity at the storage devices wherein each FE SAN requests a write lock from at least one of the BE SAN controllers on receiving a write command from an associated host CPU, upon grant of write lock by the BE SAN the FE SAN writes data to the BE SAN for writing to an appropriate storage device, and the FE SAN releases the write lock on completing writing of data to the BE SAN so that data may be transferred from a host CPU to an appropriate storage device;

a back-end network-interface coupled to each one of the plurality of BE_SAN via the back-end system bus;

a network fabric interconnecting each of the front-end network-interface of the plurality of FE_SAN controllers with each of the back-end network-interface of each of the plurality of BESAN controllers; and SAN virtualization software executing on the FE SAN controllers and the BE_SAN controllers; and wherein the SAN virtualization software on the FE_SAN controllers is configured to request data from the BE_SAN so that data may be transferred to one of the plurality of host CPUs from the appropriate storage device;

wherein the Back End software includes access control software that is configured to restrict read or write access to a specific logical block addresses (LBAs) during writes to prevent data corruption while allowing concurrent unrestricted access other unlocked logical blocks;

wherein there are at least two FE_SANs, and wherein if a first FE_SAN and a second FE_SAN request write lock to a same logical block address, the BE_SAN grants a lock request to the first FE_SAN upon when its buffer has sufficient space for the indicated amount of data of the first FE_SAN's write lock request or when the appropriate storage device is available for writing; and when the BE_SAN grants write lock to the second FE_SAN when it has sufficient buffer space available both for the indicated amount of data of the first FE_SAN's write lock request and for an indicated amount of data of the second FE_SAN's write lock request.

24. The data processing system of claim 23, wherein the host system bus or back-end system bus is a Peripheral Component Interconnect (PCI) bus.

25. The data processing system of claim 23, wherein the host system bus or back-end system bus includes a Peripheral Component Interconnect (PCI) bridge.

26. The data processing system of claim 23, wherein the back-end network-interface and the front-end network-interface include Infiniband interface cards.

27. The data processing system of claim 1, wherein the host system bus or back-end system bus is a Peripheral Component Interconnect (PCI) bus.

28. The data processing system of claim 1, wherein the host system bus or back-end system bus includes a Peripheral Component Interconnect (PCI) bridge.

29. The data processing system of claim 1, wherein the back-end network-interface and the front-end network-interface include Infiniband interface cards.

30. The data processing system of claim 1 wherein write lock requests from the FE_SAN include a write size indicating an amount of data, wherein the BE_SAN may cache write data, and wherein the BE_SAN grants write lock to a FE_SAN when its cache has sufficient space for the indicated amount of data.

31. The data processing system of claim 1 wherein at least one FE_SAN releases all its write requests if the BE_SAN indicates there are overlapping write requests and the BE SAN refuses write lock.

32. The data processing system of claim 1 wherein a FE_SAN may request distributed lock across multiple BE_SANs.

* * * * *